United States Patent

[11] 3,599,494

[72] Inventor Henry P. Lichte, Jr.
 4130 Villanova, Houston, Tex. 77005
[21] Appl. No. 743,681
[22] Filed July 10, 1968
[45] Patented Aug. 17, 1971

[54] GYROSCOPE PICK-OFF AND TORQUER DEVICE
 14 Claims, 3 Drawing Figs.
[52] U.S. Cl.................................................. 74/5.6,
 310/232
[51] Int. Cl..................................................... G01c 19/28
[50] Field of Search............................................ 74/5.6, 5;
 310/232, 245; 250/200, 201

[56] References Cited
UNITED STATES PATENTS
2,200,431 5/1940 Rateau ........................ 74/(5.6 UX)
2,368,644 2/1945 Curry, Jr. ....................... 74/5.6 X
2,512,598 6/1950 Barkalow ...................... 74/5.6
2,523,081 9/1950 Wendt........................... 74/5 X
2,606,310 8/1952 Baker............................ 74/5.6 X
2,766,625 10/1956 Swanson....................... 74/5
3,321,980 5/1967 Hildebrand................... 310/232 X
3,396,586 8/1968 Maclin et al. ................. 74/5

*Primary Examiner*—Manuel A. Antonakas
*Attorneys*—George L. Church, Donald R. Johnson, Wilmer E. McCorquodale and John E. Holder

ABSTRACT: A torqueing motor for applying a restorative force to the gimbal of a gyro in order to maintain the rotor housing of the gyro perpendicular to the outer gimbal. A light sensitive device is utilized for transmitting indications of rotor tilt to the restoring motor with the restoring torque being applied to the vertical bearings of the outer gimbal by means of slip rings and brushes.

PATENTED AUG 17 1971    3,599,494

INVENTOR
HENRY P. LICHTE JR.

*John E. Holder*
ATTORNEY

GYROSCOPE PICK-OFF AND TORQUER DEVICE

BACKGROUND OF THE INVENTION

This invention relates to a gyroscope control, and more particularly to a means for providing a restorative force to the gyroscope in response to an error-sensing device.

Ordinarily a gyroscope device is provided with gimbals for giving the apparatus three degrees of freedom, so that under desirable operating conditions, the vertical axis of the gyro stays vertical at all times, discounting of course precessing forces due to design features. In addition, the stability of a gyroscopic instrument is directly proportional to the speed of rotation of the rotor and weight of the rotor. Borehole surveying instruments incorporating gyroscopic devices are constructed under size and space limitations which require deviation from the more basic design characteristics of gyroscopes. Because of the confined space permitted for housing of the instruments, the size of the rotor is limited, as well as provisions for a third gimbal. Therefore, such borehole instruments commonly have only two degrees of freedom.

In borehole surveying instruments it is also important to maintain a reference between the inclination of the hole and the direction or orientation of the instrument within the deviated hole. If the gyroscope rotor housing is maintained in a horizontal position throughout the survey, tilting of the instrument in the hole as it changes its deviation will cause tilting of the rotor housing in its intercardinal points, and thus create intercardinal error. Corrections for such intercardinal error are made from exponential curves which plot the error with respect to the degree of intercardinal tilt. On the other hand, if the rotor housing is maintained in a position at 90° to the outer gimbal, any tilting of the instrument through its deviated course within the borehole will cause tilting of the rotor housing along its center of roll, so that no moment is generated about the vertical or longitudinal axis of the gyro. Any errors introduced by tilting of the instrument under the latter condition will therefore follow a linear relationship with the degree of tilt, and thus can be more accurately compensated for. In addition, it has been found that systems for providing restorative forces to a gyroscope are often sources of unwanted friction, and therefore tend to introduce undesirable errors.

It is therefore an object of the present invention to provide a new and improved gyroscope control device.

SUMMARY OF THE INVENTION

With this and other objects in view, the present invention contemplates a gyroscope control device including a reversing motor, a light responsive sensing means on the device, and means for controlling the reversing motor in response to signals from the sensing means which are indicative of the relative position of gimbals in the gyroscopic device. The reversing motor, rather than being directly attached to the outer gimbal of the gyroscope, instead drives brushes for contacting movement with slip rings, which are attached to one of the gimbals on the device. The friction thus generated supplies the torqueing force for restoring the gimbals to a desired position relative to one another.

A complete understanding of this invention may be had by reference to the following detailed description, when read in conjunction with the accompanying drawings illustrating an embodiment thereof.

DESCRIPTION OF THE PREFERRED EMBODIMENTS

Figure 1:
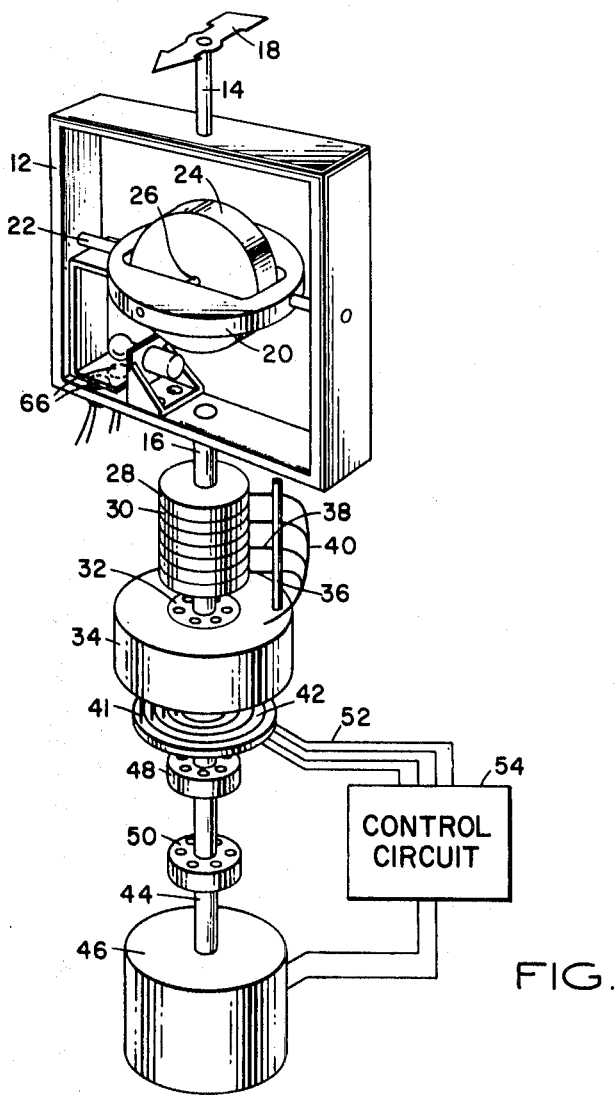
FIG. 1 is a perspective schematic view of a gyroscope instrument embodying principles of the present invention.

FIG. 1 of the drawings shows a schematic arrangement of a gyroscopic instrument for use, as for example, in a well bore surveying apparatus. The device includes an outer gimbal 12 having upper and lower shafts 14 and 16 respectively extending outwardly from the gimbal 12 along its longitudinal axis. A reference indicator 18 is shown positioned on the upper end of the upper shaft. Means (not shown) may be provided in the instrument housing for photographically observing the orientation of the indicator, or electrical sensing means may be utilized to transmit such information directly to the surface to provide azimuth information relative to the instrument orientation. An inner gimbal or rotor housing 20 is mounted within the outer gimbal and is journaled for rotation about its own tilt axis 22. A gyro wheel or rotor 24 is mounted within the inner gimbal 20 for rotation about a spin axis 26.

Electrical transmission means for the apparatus includes slip rings 28 which are positioned about the lower, downwardly extending shaft 16. Slip rings 28 are coupled to the shaft 16 by means of set screws or the like (not shown). Insulators 30 are positioned between the slip rings to isolate the electrical paths represented by each of the slip rings. The lower end of the downwardly extending shaft 16 is positioned in a ball bearing 32, which in turn is mounted within a brush holder 34. The brush holder 34 is arranged to rotate relative to the downwardly extending shaft 16. A brush rod 36 extends upwardly from the brush holder 34, and includes wire brush elements 38 extending transversely from the rod into sliding contact with the individual ship rings 28. Conductor wires 40 connect the individual brush elements 38 with a second set of brushes 41, which extend downwardly from the under surface of the brush holder 34. The second set of brushes are arranged for contacting a second set of slip rings 42, which are formed by concentric circular conducting elements separated by insulating rings. The second set of slip rings are positioned about a reversing motor shaft 44 and mounted for rotation relative to such shaft. The upper end of the reversing motor shaft 44 is connected to the brush holder 34 and provides means for rotating the brush holder upon activation of a reversing motor 46. The reversing motor shaft 44 is supported for rotation by upper and lower ball bearings 48, 50, which are mounted about the shaft between the reversing motor 46 and the lower or second set of slip rings 42. Conductor wires 52 extending from the lower slip rings 42 are connected through a control circuit 54 to the reversing motor 46, and power supply (not shown) for the instrument.

Figure 2:
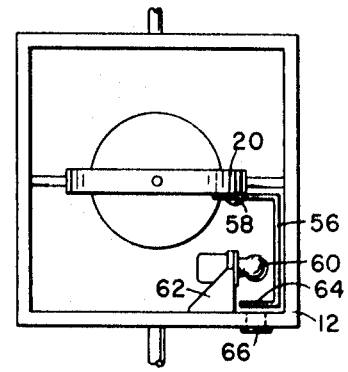
FIG. 2 is a side view of the gyro components showing a tilt sensing means in accordance with the present invention.

Referring now to FIG. 2 of the drawings, the gimbal position sensing portion of the instrument is shown in greater detail. An L-shaped arm member 56 is shown extending downwardly from the inner gimbal 20, and is attached to the lower side of the inner gimbal by a screw 58. A light source or lamp 60 is positioned on the outer gimbal 12. A bracket 62 is attached to the lower wall of the outer gimbal and includes means for receiving the threaded end of the lamp 60. The lamp is arranged to be positioned about a bent portion 64 of the arm 56 extending downwardly from the inner gimbal. A pair of light sensitive elements 66, which may be light sensitive resistors, photoelectric sensors, or similar light sensitive devices, are mounted on the outer gimbal facing the lamp 60. When the inner gimbal 20 is in its normal preferred position perpendicular to the outer gimbal, the bent portion 64 of the downwardly extending arm member is positioned between the lamp 60 and light sensitive elements 66 and is arranged to cover equal portions of the two light sensitive elements. Therefore, light emanating from the lamp 60 will supply light of equal intensity to each of the light sensitive elements 66.

Figure 3:
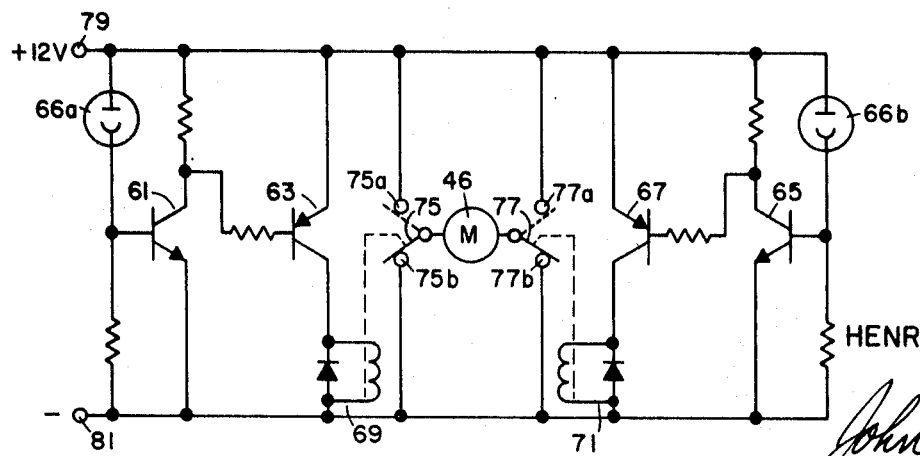
FIG. 3 is a schematic drawing of the electrical circuit of the present invention.

Referring next to FIG. 3 of the drawings, the control circuit 54 is shown for sensing error signals from the light sensitive devices 66, and for providing corrective signals to the reversing motor 46 in response to such sensed error signals. The light sensitive elements are shown at 66a and 66b, and are incorporated into separate channels of the circuit. The output of light sensitive element 66a is fed to transistors 61, 63. Forming an amplifier circuit associated with the element 66a. The output of element 66b is fed to transistors 65 and 67, forming an amplifier circuit in conjunction with the light-sensitive element 66b. Relays 69 and 71 are provided for the respective sensing element channels and amplifiers associated therewith, for driving the reversing motor 46 in opposite directions. A positive voltage is supplied to the circuit at 79, while point 81 of the circuit is at a negative potential. Each of the relays 69, 71 are provided with switches 75 and 77 respectively. The switches on the relays are normally held in their lower contact positions by springs or the like, i.e.; the switches 75, 77 are normally engaging contacts 75b and 77b, respectively.

In the operation of the apparatus described above, the instrument may, as for example when passing through a deviated well bore, become tilted from a vertical position. This in turn will cause the inner gimbal 20 of the gyro to tilt about its axis 22. Should such tilting occur when the gimbal 20 is in an intercardinal plane, an error would be created which would be an exponential function of the degree of tilt. The present invention maintains the inner gimbal 20 of the apparatus in a position which is 90° to the longitudinal plane of the outer gimbal. The longitudinal plane of the outer gimbal is defined by a plane passing through shafts 14, 16, and axis 22. In this configuration any error generated by movement of the inner gimbal from a horizontal position would follow a linear function, thus providing greater accuracy to techniques for correcting the readings.

As the instrument tilts from the vertical, the inner gimbal tries to move from a position 90° to the outer gimbal. Such relative movement of the gimbals from their preferred perpendicular position causes the downwardly extending arm 56 to tilt. In so doing, the bent portion 64 on the arm member 56 moves with respect to the light sensitive elements 66 mounted in the lower wall of the outer gimbal. When the arm moves relative to the light sensitive elements, the variation of light intensity on the elements 66 creates an imbalance in the electrical function of the elements 66a and 66b. This causes, depending upon the direction of the tilt, one of the amplifier circuits to generate a signal activating one of the relays 69 or 71. For example, if element 66a were a photocell, and the arm 56 were tilted in a manner to provide more light to element 66a, this would cause saturation of the amplifier circuit consisting of transistors 61 and 63. Upon saturation of transistor 63, relay 69 is activated and causes the switch 75 of the relay 69 to move to a positive potential or upper contact 75a as shown by the dotted lines in FIG. 3. At the same time, switch 77 of the relay 71 on the opposite amplifier is at ground potential or engaging lower contact 77b. Therefore, the motor 46 will run in a certain direction, say clockwise in this case.

In the opposite condition, i.e.; when the rotor tilts in an opposite direction, photocell 66b is activated to cause a saturation of transistors 65 and 67. The relay 71, which is in the collector circuit of transistor 67 will be activated, thereby causing the switch 77 of relay 71 to pull to a positive potential at contact 77a. Since the switch 75 of relay 69 is in its normal down position and is at ground or negative potential, this will cause the motor 46 to run in an opposite direction. Such activation of the reversing motor 46 of course will be ceased when the arm 56 returns to a position relative to the light-sensitive elements which causes a balance in the light impinging upon the elements, or what shall be termed a "null" position.

The corrective control of the gyroscopic instrument in response to the sensed movement of the inner gimbal is as follows: Such movement by means of the light sensitive elements and control circuit described above causes operation of motor 46. The reversing motor rotates the shaft 44 in one or the other direction, depending upon the sensed error signal. The rotation of the shaft 44 is transmitted to the brush holder 34 which is mounted for rotation relative to the downwardly extending shaft 16 of the outer gimbal. Movement of the brush holder 34 causes the individual first set of brushes 38 mounted thereon to slide along the outer peripheral surface of the slip rings 28. This creates a friction force between the brushes 38 and the slip rings 28, which in turn imparts a torque to the downwardly extending shaft 16 of the outer gimbal 12. Such torque in turn, creates a precessing moment about the longitudinal axis which, when applied to the gyroscopic device, causes the inner gimbal 20 to precess. The circuit is arranged, of course, so that the applied torque and resulting precessing movement is in a direction opposite to the tilting movement of the inner gimbal away from its normal position 90° to the outer gimbal. The precessing movement continues until the arm 56 returns to the null position where the inner gimbal is perpendicular to the outer gimbal. Upon reaching the null position, the control circuit is neutralized and the reversing motor is inactive. This condition is maintained until the inner gimbal is tilted from a position perpendicular to the outer gimbal.

The arrangement of the apparatus in the manner described above, i.e.; with the reversing motor 46 being movable independently of the shaft 16 of the outer gimbal, permits a relatively friction free movement of the shaft 16 within bearings 32, rather than the reversing motor output being coupled directly to the shaft 16 of the outer gimbal. The corrective torque instead is transmitted to the outer gimbal by means of the brushes 38 and slip rings 28. The accuracy of the instrument is thereby enhanced, since the gyroscopic elements are more perfectly mounted with respect to frictional forces imposed thereon. In addition, the use of light sensitive elements precludes the use of pendulous members, which are mounted for swinging movement on many gyroscopes in order to transmit error signals to restoring devices. This further enhances the balance, control, and friction free movement of the gyro.

While a particular embodiment of the present invention has been shown and described, it is apparent that changes and modifications may be made without departing from this invention in its broader aspects; and therefore, the aim in the appended claims is to cover all such changes and modifications as fall within the true spirit and scope of this invention.

What I claim is:

1. In a gyroscopic apparatus having inner and outer gimbals and a rotor, means for controlling the relative position of portions of the apparatus, which means comprises: power means for applying a rotative movement to an element of the apparatus; means for sensing movement of a portion of the apparatus; means for transmitting information indicative of the sensed movement to said power means; and friction generating means for transmitting said rotative movement into a torqueing force applied to another portion of the apparatus, said applied torqueing force being responsive to said sensed movement.

2. The apparatus of claim 1 wherein said information transmitting means and friction generating means are the same means.

3. The apparatus of claim 1 wherein said friction generating means includes slip ring means fixed relative to said another portion and brush means fixed relative to said element of the apparatus.

4. In a gyroscopic device having inner and outer gimbals a rotor and a longitudinal axis for providing a directional reference, means for controlling the relationship of portions of the device, which means includes: light sensitive means mounted on the device; means mounted on one of the gimbals for controlling the amount of light impinging upon said light sensitive means; means for imparting a precessing moment to one of the gimbals; and means for sensing the amount of light received by said light sensitive means and for controlling the amount of precessing moment applied to said one of the gimbals, said imparting means including means for applying a slipping force to said longitudinal axis.

5. The apparatus of claim 4 wherein said light controlling means includes a member mounted on the inner gimbal and movable relative to said light sensitive means for controlling the amount of light impinging upon said light sensitive means in a manner which is indicative of the amount of tilt of said inner gimbal.

6. In a directional gyroscopic device having inner and outer gimbals, longitudinal shafts forming an axis for the outer gimbal, and a rotor mounted in said inner gimbal, means for controlling the tilt of said inner gimbal about its own axis, which means comprises: means for sensing the amount and direction of tilt of said inner gimbal about its axis, 1st contact means on one of the longitudinal shafts fixed with respect to said longitudinal shaft and outer gimbal; reversing motor means having a shaft, 2nd contact means fixed for movement with the reversing motor shaft, said 1st and 2nd contact means being arranged for contact with one another and for relative movement, said contact between said 1st and 2nd contacts during relative movement therebetween providing a torqueing force to said longitudinal shaft for controlling the tilt of said inner gimbal; and means for driving said reversing motor in response to said sensing means.

7. The apparatus of claim 6 wherein said sensing means includes a pair of light sensitive elements in side by side relationship, a light source, light blocking means attached to said inner gimbal and movable with said inner gimbal to provide an imbalance of light impinging upon said light sensitive elements when said inner gimbal is tilted, and means responsive to such light imbalance for driving a reversing motor, the rebalancing of said light impinging upon said light sensitive elements causing said reversing motor to stop.

8. The apparatus of claim 6 wherein said 1st and 2nd contact means are slip rings and brushes which transmit the sensed changes in tilt of said inner gimbal to said means for driving said reversing motor.

9. In a gyroscope having inner and outer gimbals, a rotor, and a longitudinal shaft extending from the outer gimbal, means for controlling relative movement between the inner and outer gimbals, which means includes: slip rings fixed on said longitudinal shaft; brush means mounted on a member and arranged for sliding contact with said slip rings; reversible motive means having an output shaft for moving said brush means; a control circuit for supplying power to said motive means; light sensitive means mounted on one of the gimbals; light retarding means mounted on the other of said gimbals; a light source arranged on the gyroscope to direct light to said light sensitive means; said light retarding means being arranged to impede the direction of light to said light sensitive means; and said light sensitive means forming a part of said control circuit.

10. The apparatus of claim 9 wherein said light sensitive means includes a pair of light sensitive elements which are arranged relative to said light source and light retarding means so that equal amounts of light are received by said elements when the gimbals are in a predetermined desired relative position and an imbalance of light impinging upon said elements causes said motive means to be operated, with the direction of operation of said motive means being dependent on the direction of relative movement between the gimbals.

11. The apparatus of claim 10 and further including a second set of slip rings and brushes, said second set of slip rings being mounted about said output shaft for relative movement therewith, and said second brushes being attached to said member holding said brush means, said second set of brushes and slip rings providing means for transmitting electrical signals between said control circuit and said light sensitive means.

12. In a gyroscopic apparatus for use in a well tool, inner and outer gimbals having an axis, a rotor mounted in said inner gimbal, means for supplying power to said rotor, and means for rotating said power supplying means to apply a precessing moment to one of said gimbal axis, said rotative means being operative only while said inner and outer gimbals are in a relative position other than 90° to one another for applying said precessing moment to said one of said gimbal axis.

13. The apparatus of claim 12 and further including light sensitive means for detecting such relative position other than 90°.

14. The apparatus of claim 13 and further including torque motor means responsive to said detecting means for operating the moment applying means.

UNITED STATES PATENT OFFICE
CERTIFICATE OF CORRECTION

Patent No. 3,599,494                    Dated August 17, 1971

Inventor(s) Henry P. Lichte, Jr.

It is certified that error appears in the above-identified patent and that said Letters Patent are hereby corrected as shown below:

Column 1, line 36, after "instrument" insert -- resulting from the movement of the instrument --. Column 2, line 31, "ship" should read -- slip --.

Signed and sealed this 25th day of July 1972.

(SEAL)
Attest:

EDWARD M. FLETCHER, JR.                    ROBERT GOTTSCHALK
Attesting Officer                          Commissioner of Patents